United States Patent [19]
Battaglia et al.

[11] Patent Number: 5,722,803
[45] Date of Patent: Mar. 3, 1998

[54] CUTTING TOOL AND METHOD OF MAKING THE CUTTING TOOL

[75] Inventors: Frank B. Battaglia, Latrobe; Vincent J. Cackowski, Derry; Aharon Inspektor, Pittsburgh; Edward J. Oles, Ligonier; John J. Prizzi, Greensburg, all of Pa.

[73] Assignee: Kennametal Inc., Latrobe, Pa.

[21] Appl. No.: 502,437

[22] Filed: Jul. 14, 1995

[51] Int. Cl.⁶ .................................................. B23B 27/14
[52] U.S. Cl. ........................ 407/119; 407/115; 408/144; 408/145
[58] Field of Search .................................. 407/119, 118, 407/115; 51/293

[56] References Cited

U.S. PATENT DOCUMENTS

| | | |
|---|---|---|
| 4,087,193 | 5/1978 | Mundy . |
| 4,647,546 | 3/1987 | Hall, Jr. et al. ................ 501/96 |
| 4,710,069 | 12/1987 | Loqvist . |
| 4,741,649 | 5/1988 | Mori . |
| 4,854,785 | 8/1989 | Lowe et al. . |
| 5,066,553 | 11/1991 | Yoshimura et al. . |
| 5,110,349 | 5/1992 | Westergren et al. . |
| 5,120,327 | 6/1992 | Dennis ........................ 51/293 |
| 5,215,415 | 6/1993 | Fukuoka et al. . |
| 5,250,367 | 10/1993 | Santhanam . |
| 5,266,388 | 11/1993 | Santhanam et al. ........... 428/212 |
| 5,271,758 | 12/1993 | Buljan et al. ................ 75/232 |
| 5,325,747 | 7/1994 | Santhanam . |
| 5,330,296 | 7/1994 | Beeghly et al. ............... 407/119 X |
| 5,330,853 | 7/1994 | Hofmann et al. ............. 428/697 |
| 5,348,808 | 9/1994 | Goto et al. . |
| 5,352,067 | 10/1994 | Arai et al. .................... 407/119 X |
| 5,355,969 | 10/1994 | Hardy et al. ................. 175/432 |
| 5,364,209 | 11/1994 | Santhanam et al. . |
| 5,374,471 | 12/1994 | Yoshimura et al. ........... 428/216 |
| 5,405,711 | 4/1995 | Noggle ........................ 407/119 X |
| 5,431,072 | 7/1995 | Christoffel ................... 407/119 X |
| 5,491,028 | 2/1996 | Sarin et al. .................. 428/408 |
| 5,558,789 | 9/1996 | Singh .......................... 219/121.69 |
| 5,565,176 | 10/1996 | Grab et al. . |

FOREIGN PATENT DOCUMENTS

| | | |
|---|---|---|
| 133386 | 2/1985 | European Pat. Off. . |
| 635326 | 1/1995 | European Pat. Off. . |
| 2283772 | 5/1995 | United Kingdom . |

OTHER PUBLICATIONS

International Search Report Mailed Sep. 19, 1996 in PCT Application No. PCT/US96/06494, International Filing Date May 8, 1996.

*Primary Examiner*—M. Rachuba
*Assistant Examiner*—Henry W. H. Tsai
*Attorney, Agent, or Firm*—John J. Prizzi

[57] ABSTRACT

A coated cutting tool, and a method of producing the same, comprising a substrate which has a roughened surface that presents a surface roughness of between 15 microinches $R_a$ and 125 microinches $R_a$. A coating is applied to the roughened surface of the substrate by physical vapor deposition. A coated cutting tool having a low cobalt substrate and experiencing long tool life is also discussed.

62 Claims, 7 Drawing Sheets

CUTTING TOOL AND METHOD OF MAKING THE CUTTING TOOL

BACKGROUND OF THE INVENTION

The invention pertains to a cutting tool, and a method of making the same, that provides for improved chip control, improved surface finishing properties, and/or improved coating adhesion. The invention further pertains to a coated cutting tool with a low cobalt substrate and having a long tool life.

More specifically with respect to the chip control properties, the invention pertains to a cutting tool, and a method of making the same, with a rake face having microtopographical properties that provide chip control features without the need for a structural chip breaker. More specifically, the rake surface of the cutting tool has an appropriate surface roughness so as to provide chip control properties.

In regard to the improved surface finishing properties, the invention concerns a cutting tool, and a method of making the same, that has the capability to machine the workpiece so as to present a smooth machined surface. More particularly, the invention concerns a cutting tool with a flank face that is smooth so as to produce a desirably smooth surface finish on the surface of the workpiece.

In addition, the invention pertains to a cutting tool, and a method of making the same, having a coating scheme thereon, such as, for example, a single layer coating deposited by physical vapor deposition (PVD) or a multi-layer coating wherein at least one layer is deposited by PVD, wherein the coating has improved adhesion.

Certain machining operations such as, for example, threading, grooving or cutoff, have the tendency to produce long chip strings or "birds nests". The production of these long chip strings, as opposed to shorter C-shaped/figure six-shaped chips or short coils, are not desirable.

Certain materials are difficult to machine without creating long chip strings. In other words, due to the very nature of the material there is the tendency to produce long chip strings through any machining operation on these materials. These materials include titanium alloys, aluminum alloys and low carbon steels.

Earlier cutting tools provide special chip breaker structures or geometries on the rake surface of the cutting tool to break the chips. For example, U.S. Pat. No. 4,710,069 to Loquist illustrates a cutting tool that provides a structural chip breaker in the form of a number of depressions that cooperate with the chip breaking face.

While the structural chip breakers may perform in a satisfactory fashion, the typical geometry of cutting tools with structural chip breakers may be complex. In regard to the manufacture of such cutting tools, a complex geometry requires rams of a complex and intricate design. It can be expensive to make rams that have such a complex and intricate geometry.

The use of cutting tools with structural chip breakers typically requires there to be an inventory of a number of different styles of cutting tools, each with a different structural chip breaker depending upon the specific application. It can be expensive for the user to inventory many different styles of cutting tools. It can be expensive for the manufacturer of the tools to keep an inventory of many different styles of rams required to make these structural chip breaker geometries.

Many machining applications require the surface of the machined workpiece to have a certain finish or smoothness. To meet this objective, earlier cutting tools, where necessary, have been ground or polished to present a relatively smooth surface on both the rake face and the flank face. While this arrangement produces a workpiece with a satisfactory surface finish, there is no effective chip control unless such a cutting tool includes a structural chip breaker. The lack of effective chip control in the typical cutting tool having a smooth rake face and a smooth flank face can result in the production of the long chip strings. This is especially true when machining a workpiece material that typically generates long chip strings.

In the past, coatings like TiAlN have been applied to substrates for cutting tools such as, for example, cemented carbides and cermets, via physical vapor deposition (PVD) techniques such as, for example, sputtering, ion plating and cathodic arc. These substrates have presented a surface that has been relatively smooth in that it has been in an as-ground condition, an as-molded condition, or a grit-blasted condition. Heretofore, the adherence of the PVD coating decreased as the thickness of the coating increased. PVD coating thicknesses had to be held below about 6 micrometers to maintain adequate adherence to the substrate. In the case of the TiAlN PVD coating, the thickness could not exceed about 5 micrometers and still maintain adequate adherence to the substrate for cutting tool applications. Because of the high residual stresses associated with the application of a PVD-applied TiC or cubic Boron Nitride coating, such a coating has not been able to applied at any functional thickness, i.e., a thickness that is sufficient for the cutting tool to be commercially practical, with adequate adhesion strength.

In the past, persons have used multi-layer coating schemes applied by a combination of chemical vapor deposition (CVD) and PVD techniques. One such example of a multi-layer coating scheme comprises a base layer of TiN applied by CVD, an intermediate layer of TiCN applied by CVD, and a top layer of TiN applied by PVD techniques to a substrate that has binder enrichment in a surface layer. This combination coating scheme is a subject of U.S. Pat. No. 5,250,367 to Santhanam et al. entitled BINDER ENRICHED CVD AND PVD COATED CUTTING TOOL, and assigned to the assignee of the present patent application. In U.S. Pat. No. 5,250,367 the substrate has a bulk cobalt content of 3 to 12 weight percent with 5 to 8 weight percent and 5.5 to 7 weight percent as more preferable ranges for the cobalt content. Specific examples include cobalt contents of 10.5, 8.5 and 9.5 weight percent cobalt. U.S. Pat. No. 5,325,747 to Santhanam et al. for METHOD OF MACHINING USING COATED CUTTING TOOLS, and assigned to the assignee of the present patent application, discloses a cutting tool with a substrate that has one or more layers applied by CVD and an outer layer of TiN applied by PVD. In the case where the substrate is a WC-Co material, the cobalt has a range of 3 to 12 weight percent with more preferable ranges of 5 to 7 weight percent and 5.7 to 6.3 weight percent. The specific examples show cobalt contents of 6.0, 8.5, 9.75, 10, 10.5 and 11.5 weight percent. U.S. Pat. No. 5,364,209 to Santhanam et al. for CVD AND PVD COATED CUTTING TOOLS, and assigned to the assignee of the present patent application, discloses a cutting tool having a substrate with at least one inner CVD—applied layer and an outer layer applied by PVD. In the case where the substrate is WC-Co, the binder (cobalt) ranges between 5 and 15 weight cobalt with more preferable ranges being between 7 and 13 weight percent and 8 and 12 weight percent cobalt. U.S. Pat. No. 5,066,553 to Yoshimura entitled SURFACE-COATED TOOL MEMBER OF TUNG- STEN CARBIDE BASED CEMENTED CARBIDE mentions the resintering of a substrate to achieve better adherence for a CVD applied coating.

It becomes apparent that the earlier cutting tools have drawbacks. These drawbacks pertain to the chip control properties of the cutting tools, the surface finishing properties of the cutting tools, and the adhesion of the coating to the cutting tool substrate.

It would be desirable to provide an improved cutting tool, as well as a method of making the tool, that provides chip control through the microtopography of the rake face of the cutting tool either with or without the use of a structural chip breaker, but preferably without the use of a structural chip breaker. By providing such a cutting tool, one can reduce the costs of manufacture by lowering the cost of manufacturing the rams that form the powder material into the shape of the cutting tool. Such a cutting tool can also lower the cost of manufacture by decreasing the number of rams that the manufacturer must keep in inventory. Such a cutting tool will also reduce the costs associated with selling and distributing cutting tools due to the reduction in the number of cutting tools that the user must keep in inventory.

It would also be desirable to provide an improved cutting tool, as well as a method of making the tool, that provides chip control through the microtopography of the rake face of the cutting tool without the use of a structural chip breaker, as well as provides for a smooth machined surface on the workpiece. Such a cutting tool would provide both chip control and result in a smooth surface finish for the machined workpiece.

It would be desirable to provide for an improved cutting tool, as well as a method for producing the same, that has a PVD coating that exhibits improved adherence to the substrate, that has thicker PVD coatings, and that permits the use of new adherent PVD-applied coatings such as, for example, TiC, aluminum oxide, and cubic boron nitride.

It would also be desirable to provide for an improved cutting tool, as well as a method for producing the same, that has a low cobalt substrate with a coating thereon and which experiences long tool life.

SUMMARY OF THE INVENTION

In one form thereof, the invention is a coated cutting tool that comprises a substrate, and a PVD coating on the surface of the substrate. The PVD coating has an adherence as measured by the Rockwell A indentation adhesion load test of greater than or equal to 80 kg.

In another form thereof, the invention is a method of producing a coated cutting tool having a rake surface and a flank surface. The method comprises the steps of:

resintering a substantially fully dense substrate so as to produce grain growth at the surface of the substrate sufficient to provide a surface roughness between 15 microinches $R_a$ and 125 microinches $R_a$. A more preferable range for this surface roughness is between 25 microinches $R_a$ and 125 microinches $R_a$, and a still more preferable range is between 40 microinches $R_a$ and 80 microinches $R_a$; and applying a coating to the substrate wherein the outer layer is applied by physical vapor deposition on the rake surface and the flank surface of the substrate.

In still another form, the invention is a cutting tool made by powder metallurgical techniques including pressing a powder composition into a green compact. The tool comprises a substrate with a rake face and a flank face wherein a peripheral edge is at the joinder of the rake face and the flank face. The rake face presents a roughened surface formed during the pressing of the green substrate.

BRIEF DESCRIPTION OF THE FIGURES

The following is a brief description of the figures which form a part of this patent application.

DETAILED DESCRIPTION OF PREFERRED SPECIFIC EMBODIMENTS

Figure 1:
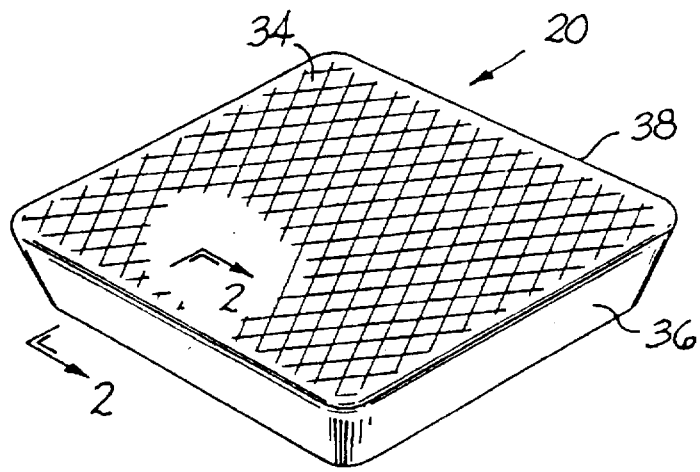
FIG. 1 is a perspective view of a first specific embodiment of a coated cutting tool of the invention.
Figure 2:
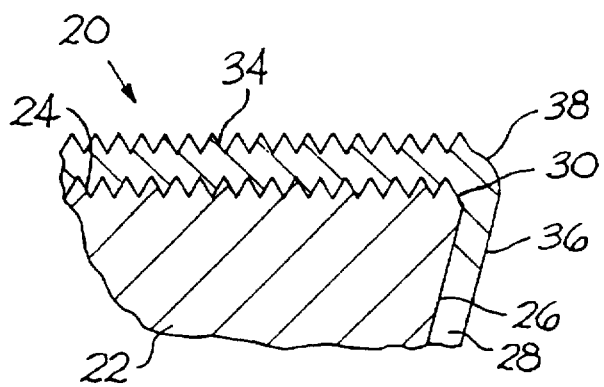
FIG. 2 is a cross-sectional view of the cutting tool of FIG. 1 taken along section line 2—2 of FIG. 1.

FIGS. 1 and 2 illustrate a first specific embodiment of the cutting tool of the invention generally designated as 20. Cutting tool 20 includes a substrate 22 which has a rake face 24 and a flank face 26. The cutting tool substrate may also be made in any of the standard shapes and sizes such as those identified in the American National Standard for Cutting Tools—Indexable Inserts—Identification System, ANSI B212.4-1986. Inserts may also have various chipbreaker structures (not shown) on their rake face as well to facilitate breakage and removal of chips.

The substrate 22 can be selected from many possible substrate materials suitable for use as a cutting tool substrate. Basic material categories includes tool steels, cemented carbides, cermets, ceramics, ceramic composites, polycrystalline diamond, and polycrystalline cubic Boron Nitride as candidates for a cutting tool substrate.

In the category of cemented carbides, one substrate is a cobalt cemented tungsten carbide composition. In these compositions, the cobalt ranges between about 0.2 weight percent to about 20 weight percent with the balance consisting essentially of tungsten carbide, and optionally, carbides and carbonitrides with tungsten, titanium, tantalum, zirconium, hafnium and/or niobium.

In the category of cermets there are titanium carbonitride-based materials having a cobalt and/or nickel binder metal. These cermets include the following grades of cermets sold by Kennametal Inc. of Latrobe, Pa. (assignee of the present patent application): KT125, KT150, KT175, and KT195.

In the category of ceramics there are silicon nitride-based, or aluminum oxide-based, ceramics with or without reinforcement additives such as silicon carbide and titanium carbide in whisker or particulate form. One example of a silicon nitride-based ceramic is KYON 3500 sold by Kennametal Inc. of Latrobe, Pa.

In the category of ceramic composites there are whisker reinforced ceramics. Examples of these types of composites includes silicon carbide whiskers and/or titanium carbide whiskers in an alumina matrix.

A coating 28 covers the rake face 24 and the flank face 26 of the substrate 22. The use of a coating 28 may or may not be necessary depending upon the specific application and the specific substrate of the cutting tool. In those cases where coatings are used, there are many variations for a coating scheme.

A single or multi-layer coating may be applied by physical vapor deposition techniques. One such example is a coating of TiAlN or TiN applied by PVD. One example of a multi-layer coating is a TiN-TiCN-TiN coating scheme such as that mentioned in U.S. Pat. No. 5,250,367 to Santhanam et al. which discloses coating schemes that comprise a combination of CVD and PVD techniques or U.S. Pat. No. 5,075,181 to Quinto et al. which discloses a multi-layer coating scheme applied solely by PVD techniques.

Alternatively or in addition to TiAlN, coating layers may be used for cutting tools include the carbides, nitrides, carbonitrides and borides of zirconium, titanium, hafnium and their alloys, alumina, cubic Boron Nitride, silicon nitride, and a thin film polycrystalline diamond layer.

Referring back to the substrate 22, the rake face 24 of the substrate 22 consists of a microscopically rough surface. The peripheral edge 30 of the substrate 22 is at the joinder of the rake face 24 and the flank face 26. The flank face 26 presents a relatively smooth surface.

In regard to the coating 28, coating 28 is illustrated in the first specific embodiment (FIG. 2) as a single layer. The coating 28 overlies the substrate 22 so that the complete coated cutting tool 20 presents an exposed rake face 34 and an exposed flank face 36. The exposed rake face 34 has a microscopically rough surface. The exposed flank face 36 presents a relatively smooth surface as compared to the rake face. The exposed peripheral edge 38 is at the juncture of the rake face 34 and flank face 36.

The roughness of the rough rake surface 24 for the substrate 22, and for the exposed rake face 34 range between 15 microinches $R_a$ and 125 microinches $R_a$ as measured on a Sheffield Proficorder Spectre Unit. A preferable range for this surface roughness is between 25 microinches $R_a$ and 125 microinches $R_a$. An even more preferable range is between 40 microinches $R_a$ and 80 microinches $R_a$.

Preferably, the roughness of the exposed smooth flank face 36 is less than 25 microinches $R_a$ as measured on a Sheffield Proficorder Spectre Unit. A more preferable surface roughness is less than 15 microinches $R_a$.

The specific embodiment of the cutting tool of FIGS. 1 and 2 presents the advantage of good adhesion of the coating on the rake face of the substrate due to the surface roughness of the rake face of the substrate. This cutting tool has good chip control due to the surface roughness on the coated rake face. This specific embodiment also exhibits good workpiece surface finish characteristics due to the smooth surface of the coated flank face.

Figure 4:
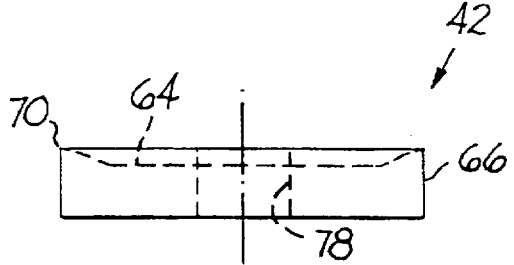
FIG. 4 is a side view of the cutting tool of FIG. 3.
Figure 3:
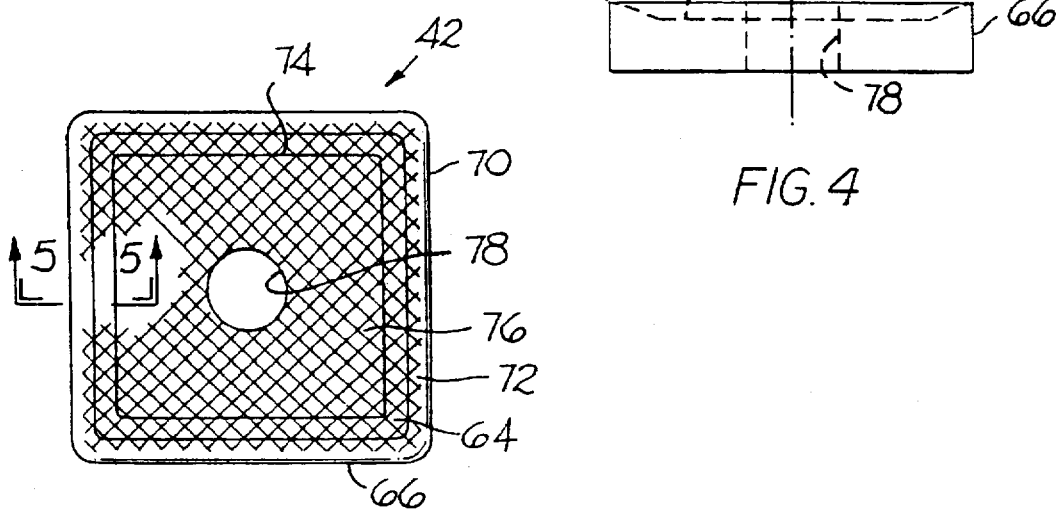
FIG. 3 is a top view of a second specific embodiment of a coated cutting tool of the invention.
Figure 5:
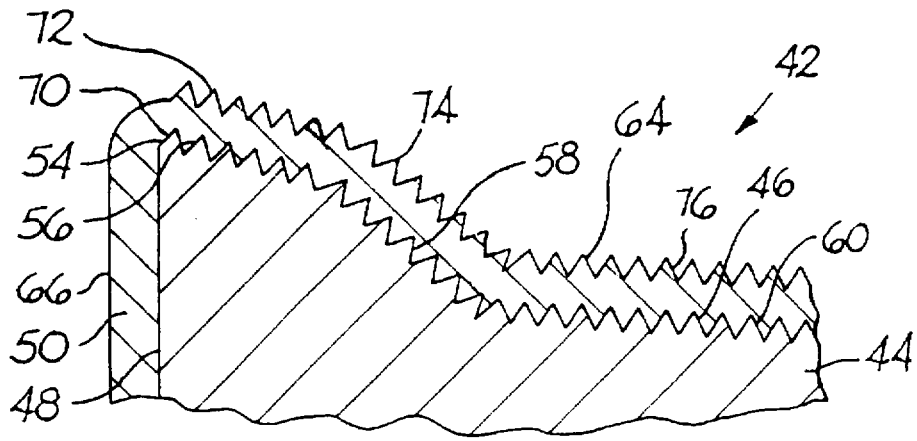
FIG. 5 is a cross-sectional view of the cutting tool of FIG. 3 taken along section line 5—5 of FIG. 3.

Referring to FIGS. 3 through 5, these drawings illustrate a second specific embodiment of the cutting tool of the invention generally designated as 42. Cutting tool 42 includes a substrate 44 (see FIG. 5) that presents a rake face 46 and a flank face 48. A coating 50 overlies the rake face 46 and the flank face 48. The types of substrates and coatings available for cutting tool 42 are the same as those available for cutting tool 20.

The substrate 44 includes a peripheral edge 54 which is at the joinder of the rake face 46 and the flank face 48. The substrate 44 has a peripheral rough surface portion 56, i.e., a portion of the surface that is microscopically rough, which extends inwardly from the peripheral edge 54 of the substrate 44. A structural chip breaker 58, which has a microscopically rough surface, extends inwardly from the inward edge of the peripheral rough surface portion 56.

The substrate 44 further includes a microscopically rough central surface portion 60. Central surface portion 60 is bounded by the structural chip breaker 58.

The coating 50 (see FIG. 5) overlies the substrate 44 to form the coated cutting tool 42 that has an exposed rake face 64 and an exposed flank face 66. The coating 50 has a peripheral edge 70 at the joinder of the exposed rake face 64 and the exposed flank face 66 of the coated cutting tool 42.

There is an exposed peripheral microscopically rough exposed rake face portion 72 that extends inwardly from the peripheral edge 70. An exposed structural chip breaker 74 then extends inwardly from the peripheral microscopically rough exposed rake face portion 72. Structural chip breaker 74 has a microscopically rough surface. The exposed rake face 64 further includes a central portion 76 that presents a rough surface. The cutting insert 42 contains a central hole 78.

The roughness of the rake surface portions (56, 58, 60) of the substrate and of the exposed rake face portions (72, 74, 76) are the same as described above for rough rake surface 24. The roughness of the flank 48 surface of the substrate 22 and the exposed flank face is the same as described above for the smooth flank face 36. In another option, the central portion 76 of the rake face may have a relatively smooth surface.

The specific embodiment of FIGS. 3 through 5 presents a cutting tool that has good adhesion of the coating to the rake face of the substrate because of the surface roughness of the rake face of the substrate. This cutting tool has good chip control properties due to the surface roughness of the coated rake face of the cutting tool. This cutting tool presents good workpiece surface finishing properties due to the smooth surface of the coated flank face.

Figure 6:
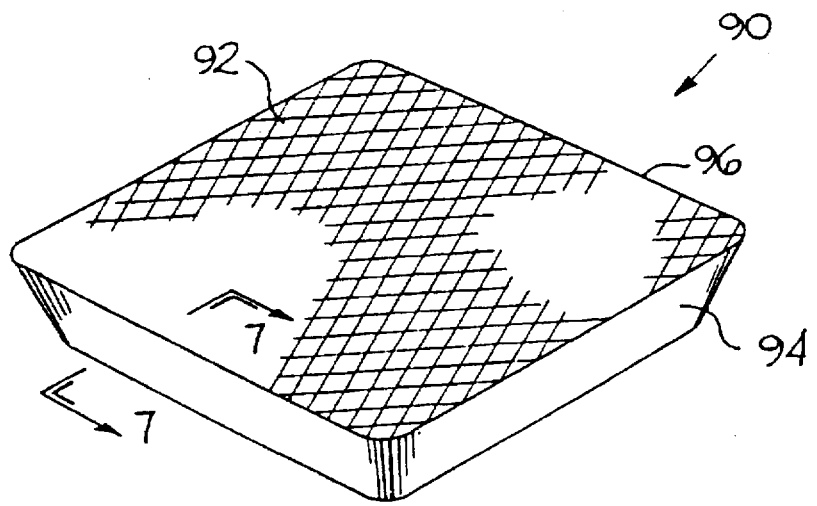
FIG. 6 is a perspective view of a third specific embodiment of an uncoated cutting tool of the invention.
Figure 7:
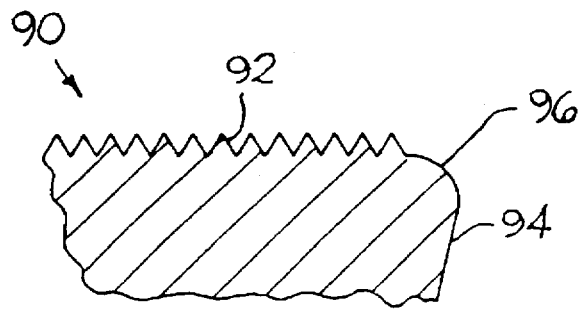
FIG. 7 is a cross-sectional view of the cutting tool of FIG. 6 taken along section line 7—7 of FIG. 6.

Referring to FIGS. 6 and 7, there is illustrated an uncoated cutting tool generally referred to as 90. The uncoated cutting tool 90 can be made from any cutting tool material suitable for use in an uncoated condition.

The uncoated cutting tool 90 includes a rake face 92 and a flank face 94. The rake face 92 presents a microscopically rough surface. The peripheral edge 96 is at the joinder of the rake face 92 and the flank face 94. The roughness of the rough rake face 92 is the same as that described above for rough rake surface 24. The roughness of the flank surface 94 is the same as that described above for the smooth flank face 36.

The uncoated cutting tool of FIGS. 6 and 7 exhibits good chip control properties due to the rough surface of the rake face of the cutting tool and provides smooth workpiece finishes due to the smooth flank surfaces of the cutting tool.

Figure 8:
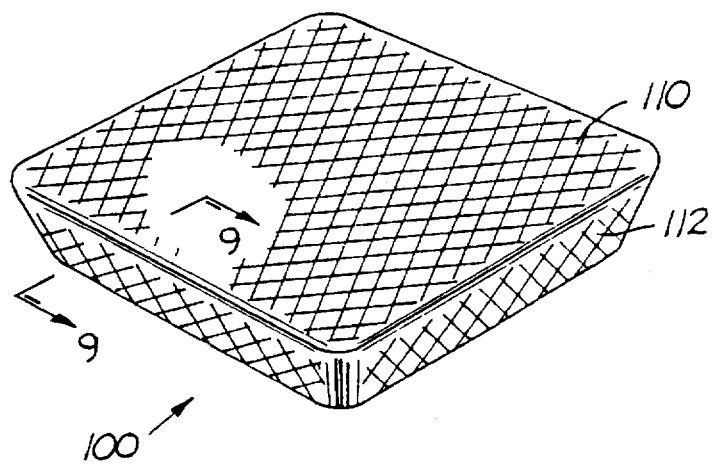
FIG. 8 is a perspective view of a fourth specific embodiment of a coated cutting tool of the invention wherein the flank surface of the substrate has a rough microtopography and the surface of the coated flank face has a rough microtopography.
Figure 9:
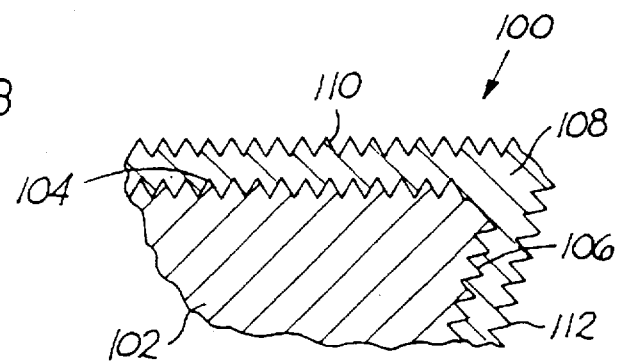
FIG. 9 is a cross-sectional view of the cutting tool of FIG. 8 taken along section line 9—9 of FIG. 8.

Referring to FIGS. 8 and 9, there is illustrated another specific embodiment of the cutting tool of the invention, generally designated as 100. Cutting tool 100 has a substrate 102 with a rake face 104 and a flank face 106. The rake face 104 is rough, i.e., has a rough surface microtopography. The flank face 106 of the substrate also has a rough microtopography. Cutting tool 100 includes a coating 108 that overlies the surfaces of the substrate 102. The rake face 110 of the coated cutting tool has a rough microtopography and the flank face 112 of the coated cutting tool also has a rough microtopography. The surface roughness of the coated rake and flank faces (110, 112) is the same as described above for the rough rake surface 24.

The specific cutting tool of FIGS. 8 and 9 exhibits good coating adherence to the rake and flank faces due to the rake and flank faces of the substrate having a surface roughness. This cutting tool provides good chip control properties due to the surface roughness of the coated rake face, but somewhat rougher workpiece surface finishes due to the surface roughness of the coated flank faces.

Figure 10:
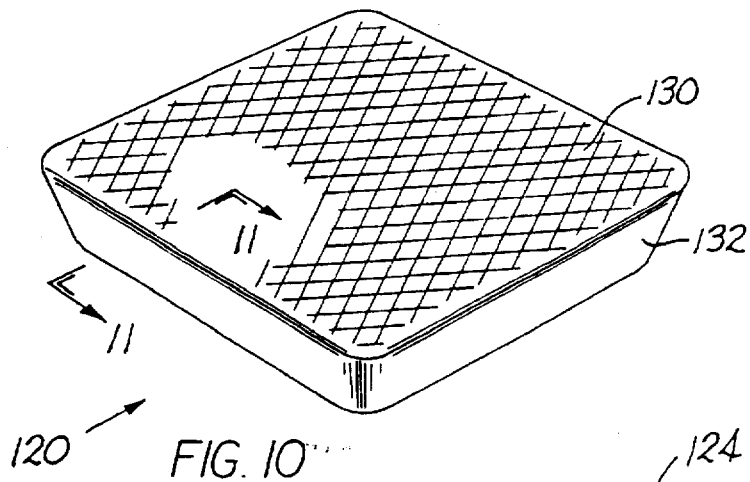
FIG. 10 is a perspective view of a fifth specific embodiment of a coated cutting tool of the invention wherein the flank surface of the substrate has a rough microtopography and the surface of the coated flank face has a smooth microtopography, while the rake face of the substrate and the coated tool have a rough microtopography.
Figure 11:
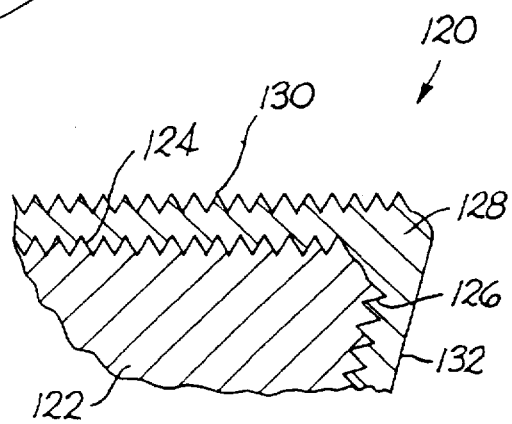
FIG. 11 is a cross-sectional view of the cutting tool of FIG. 10 taken along section line 11—11 of FIG. 10.

Referring to FIGS. 10 and 11, there is illustrated another specific embodiment of the cutting tool of the invention, generally designated as 120. Cutting tool 120 has a substrate 122 with a rake face 124 and a flank face 126. The rake face 124 is rough, i.e., has a rough surface microtopography. The flank face 126 also has a rough microtopography. Cutting tool 100 includes a coating 128 that overlies the surfaces of the substrate 122. The rake face 130 of the coated cutting tool has a rough microtopography. The surface roughness of the rake and flank faces (124, 126) of the substrate 122 and the coated rake face 130 are the same as that described above for the rough rake surface 24.

The flank face 132 of the coated cutting tool has a smooth microtopography. To achieve the smooth microtopography on the flank face of the coated tool, the flank face had to be subjected to a polishing or other treatment to smooth the surface. This is especially true in light of the fact that the flank face of the substrate has a rough microtopography. The surface roughness of the coated flank face 132 is the same as described above for the smooth flank face 36.

The cutting tool of FIGS. 10 and 11 provides the advantage of good coating adherence to the rake and flank faces of the substrate due to the surface roughness of the rake and flank faces of the substrate. This cutting tool also exhibits good chip control due to the surface roughness of the coated rake face. The cutting tool further provides good workpiece surface finish characteristics due to the smoothness of the surface of the coated flank face.

Figure 12:
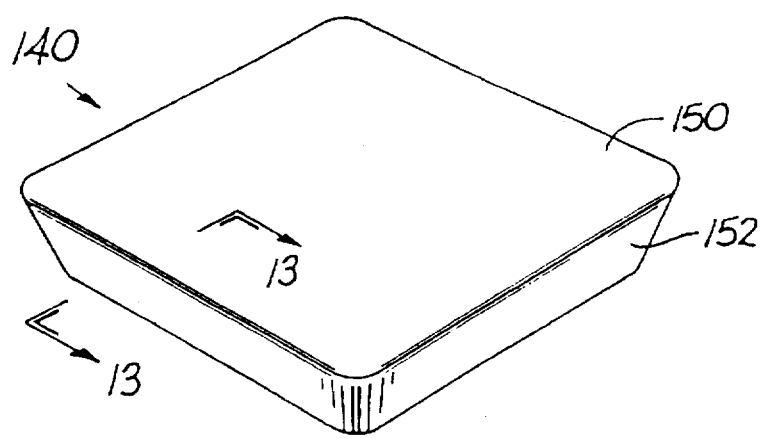
FIG. 12 is a perspective view of a sixth specific embodiment of a coated cutting tool of the invention wherein the rake surface of the substrate has a rough microtopography, the surface of the coated rake face has a smooth microtopography and the flank faces of the substrate and coated tool have a smooth microtopography.
Figure 13:
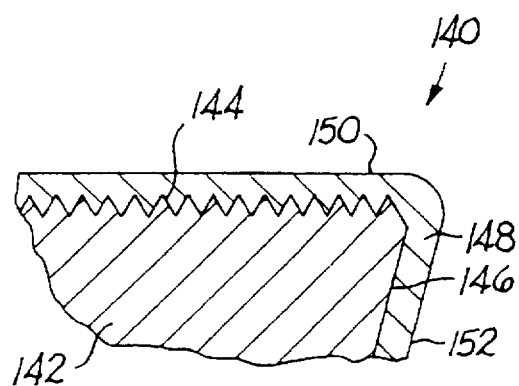
FIG. 13 is a cross-sectional view of the cutting tool of FIG. 12 taken along section line 13—13 of FIG. 12.

Referring to FIGS. 12 and 13, there is illustrated another specific embodiment of the cutting tool of the invention, generally designated as 140. Cutting tool 140 has a substrate 142 with a rake face 144 and a flank face 146. The rake face 144 is rough, i.e., has a rough surface microtopography. The flank face 126 has a smooth microtopography. Cutting tool 140 includes a coating 148 that overlies the surfaces of the substrate 142. The rake face 150 of the coated cutting tool has a smooth microtopography. The flank face 152 of the coated cutting tool also has a smooth microtopography. To achieve the smooth microtopography on the rake face of the coated tool, the rake face had to be subjected to a polishing or other treatment to smooth the surface. This is especially true in light of the fact that the rake surface of the substrate has a rough microtopography.

The surface roughness of the rake face 144 of the substrate is the same as described above for rough rake surface 24. The surface roughness of the flank face 146 of the substrate and the coated rake and flank faces (150, 152) is the same as described above for the smooth flank face 36.

The cutting tool of FIGS. 12 and 13 provides good adherence of the coating to the rake face of the substrate due to the surface roughness of the rake face of the substrate. This cutting tool provides for good workpiece surface finishing properties due to the smooth surface of the coated flank face. This cutting tool also provides for reduced tendency for a built-up edge on the coated rake face due to the surface smoothness of the rake face of the coated cutting tool.

Figure 14:
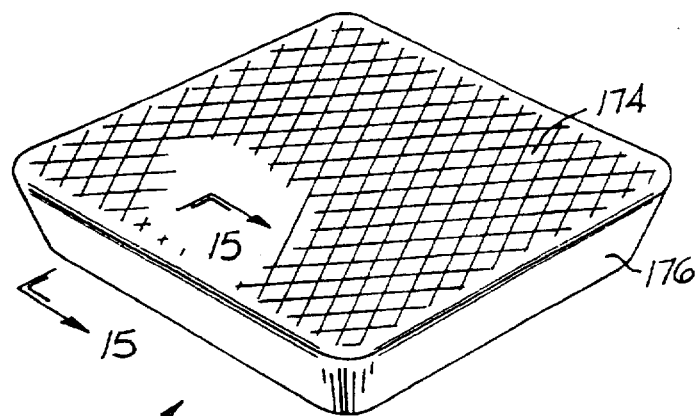
FIG. 14 is a perspective view of a seventh specific embodiment of a coated cutting tool of the invention wherein there is a multi-layer coating on the substrate.
Figure 15:
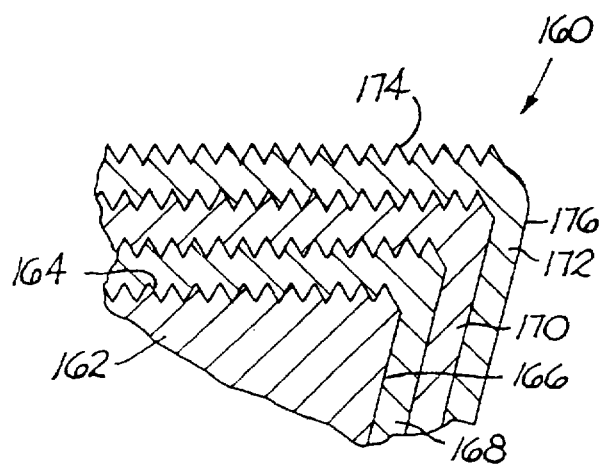
FIG. 15 is a cross-sectional view of the cutting tool of FIG. 14 taken along section line 15—15 of FIG. 14.

Referring to FIGS. 14 and 15, there is illustrated another specific embodiment of the cutting tool of the invention, generally designated as 160. Cutting tool 160 has a substrate 162 with a rake face 164 and a flank face 166. The rake face 164 is rough, i.e., has a rough surface microtopography. The flank face 166 has a smooth microtopography. Cutting tool 160 includes a multi-layered coating that overlies the surfaces of the substrate 162. The coating comprises a base layer 168, an intermediate layer 170, and a top layer 172. The rake face 174 of the coated cutting tool has a rough microtopography. The flank face 172 of the coated cutting tool has a smooth microtopography.

The surface roughness of the rake face 164 of the substrate and the coated rake face 174 is the same as described above for rough rake surface 24. The surface roughness of the rake face 166 of the substrate and the coated flank face 176 is the same as described above for the smooth flank face 36.

The cutting tool of FIGS. 14 and 15 exhibits good coating adherence to the rake surface of the substrate due to the surface roughness of the rake face of the substrate, as well as the surface roughness of the overlying coating layers. This cutting tool exhibits good chip control properties due to the surface roughness of the exposed coated rake face. The cutting tool has good workpiece surface finishing properties due to the surface smoothness of the coated flank face.

Figure 16:
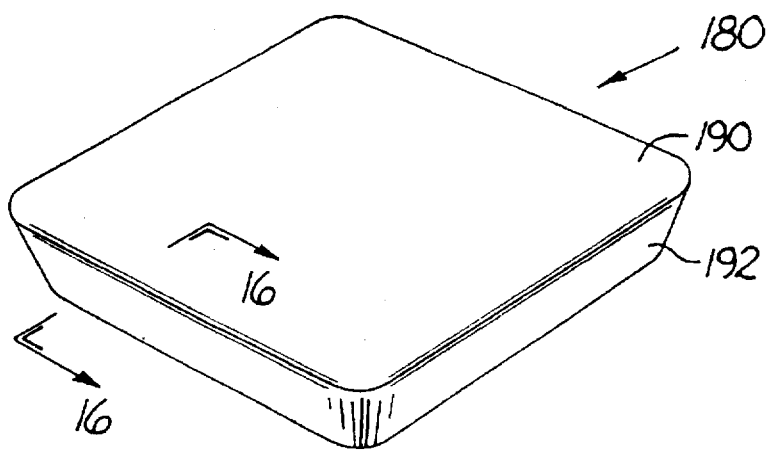
FIG. 16 is a perspective view of an eighth specific embodiment of a coated cutting tool of the invention wherein the flank and rake faces of the substrate have a rough microtopography and the coated flank and rake faces have a smooth microtopography.
Figure 17:
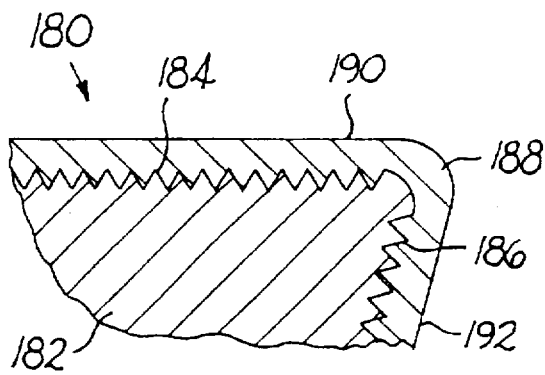
FIG. 17 is a cross-sectional view of the cutting tool of FIG. 16 taken along section line 17—17 of FIG. 16.

Referring to FIGS. 16 and 17, there is illustrated another specific embodiment of the cutting tool of the invention, generally designated as 180,. Cutting tool 180 has a substrate 182 with a rake face 184 and a flank face 186. The rake face 184 is rough, i.e., has a rough surface microtopography. The flank face 186 also has a rough microtopography. The surface roughness of the rake and flank faces (184, 186) of the substrate 182 is the same as that described above for the rough rake surface 24.

Cutting tool 180 includes a coating 188 that overlies the surfaces of the substrate 182. The rake face 190 of the coated cutting tool has a smooth microtopography. The flank face 192 of the coated cutting tool also has a smooth microtopography. To achieve the smooth microtopography on the rake and flank faces of the coated tool, these faces had to be subjected to a polishing or other treatment to smooth the surface thereof. This is especially true in light of the fact that the rake surface and flank surface of the substrate has a rough microtopography. The surface roughness of the coated rake and flank faces (190, 192) is the same as described for the smooth flank face 36.

The cutting tool of FIGS. 16 and 17 has good coating adhesion to the rake and flank surfaces of the substrate due to the rough rake and flank surfaces of the substrate. This cutting tool has a reduced tendency for a built-up edge on the coated rake face due to the surface smoothness of the coated rake face. This cutting tool provides a good workpiece surface finish due to the surface smoothness of the coated flank face of the cutting tool.

In regard to the manufacture of the cutting tools, the basic substrate is preferably made by conventional powder metallurgical techniques. More specifically, the powder components of the substrate are blended and pressed into a green compact. The green compact is then subsequently heat treated, such as by sintering, so as to form a substantially fully dense substrate (in the case of a coated cutting tool) or the uncoated cutting tool. In the alternative, a powder blend can be formed into a substantially fully dense body by the simultaneous application of heat and pressure such as, for example, by hot pressing. There are, however, several variations on the densification process necessary to form a substrate with the selective rough surfaces.

One variation of the sintering process of making the substantially fully dense substrate is to use a ram that forms the powder into the green compact which will form the necessary surface roughness in the green compact. By providing a surface roughness in the green compact of an appropriate degree and dimension, there is provided an as-sintered substrate with the appropriate surface roughness at selected positions on the surface of the substrate. The use of a ram with the necessary surface roughness is also available for the hot pressing process.

If the surface roughness of the as-sintered (or substantially fully dense) tool is excessive, only the undesirably rough locations of the tool may be ground, polished, laser glazed, or otherwise finished to produce the necessary level of smoothness. This necessary level of smoothness may, in the case of the flank face, be sufficient to generate a smooth workpiece finish in cutting, yet still leave the rough rake surface of the tool intact to produce the desired chip-flow control. In the case of the rake face, the level of smoothness may be sufficient to reduce the tendency for a built-up edge on the rake face. The flank surface of the substrate may be in a rough condition so as to improve the coating adhesion on the flank surface of the substrate.

Depending on the tool material and cutting application, the tool may be used as-is in the above described condition. In other words, the tool may be used in an uncoated condition. More commonly, however, this tool will serve as a substrate for a protective wear-resistant coating applied by CVD or PVD methods and then used in the cutting application.

The coating process parameters as known to those skilled in the art are such that the roughness characteristic of the rake and flank surfaces of the tool may be unchanged from that of the substrate prior to the coating operation. In general, however, for the typical CVD and PVD coating processes, the surface roughness of the coated tool is a function of the roughness of the underlying substrate surface and the thickness of the deposited coating. Generally speaking, as the coating thickness increases, the surface roughness of the coating also tends to increase regardless of the underlying surface roughness of the substrate. This could result in the exposed coated surfaces somewhat rougher than the surfaces of the substrate, however, such an increase in surface roughness of the rake surface of the substrate is not deleterious to the desirable chip control properties. The increase in surface roughness of the substrate does not negatively impact on the adhesion of the coating to the substrate, but will typically improve the adhesion.

An increase in surface roughness of the coated flank surface of the tool, however, could adversely affect the workpiece surface finish generated by the tool. For this reason, a post coating operation such as polishing, buffing, or laser glazing all of some of the flank surfaces of the tool may be required to smooth the surface of the coating to an acceptable surface smoothness, thus, providing acceptably smooth workpiece finishes in the cutting operation.

An increase in the surface roughness of the coated rake surface may generate a problem of a built up edge, i.e., material from the chip is welded to the rake surface of the cutting tool. To reduce the potential for a problem of a built up edge, a post coating operation such as polishing, buffing, or laser glazing all or some of the rake surfaces of the tool may be required to smooth the surface of the coating to an acceptable surface smoothness, thus, reducing the potential for the occurrence of a built up edge. The built-up edge is a problem that is workpiece material dependent. While smoothing the rake surface reduces chip control properties, it still leaves the coating with good adhesion due to the surface roughness of the rake face of the substrate.

Still another variation on the basic process uses an additional resintering step after the initial processing of the substrate. The purpose of the resintering is to enlarge the grains of the substrate, e.g., tungsten carbide, at the surface so as to form a rough irregular surface. The irregular surface presents a surface with the necessary roughness. This process is a subject of a pending U.S. patent application Ser. No.

08/159,272 filed on Nov. 30, 1993, now U.S. Pat. No. 5,585,176, entitled DIAMOND COATED TOOLS AND PROCESS FOR MAKING which is assigned to the assignee of the applicant herein and hereby incorporated by reference herein.

In this variation that uses resintering in conjunction with the cemented tungsten carbide substrate, the surface of an as-sintered tungsten carbide based cemented carbide substrate is composed of tungsten carbide hard grains bound together by cobalt or a cobalt alloy. The cobalt is not only between the tungsten carbide grains, but also covers some of the tungsten carbide grains at the substrate surface due to the wetting properties of Co and tungsten carbide under vacuum sintering conditions.

Now in accordance with the present invention, the as-sintered and ground substrate described above is now resintered under time, temperature and atmospheric conditions, to cause grain growth and binder depletion from its surfaces. The time and temperature are selected such that sufficient grain growth occurs on the surface of the resintered substrate to produce a surface roughness, $R_a$, in the ranges set out above for the rough rake surface 24.

The resintering times required to achieve the required surface roughness will depend on the starting material and the sintering conditions. As temperature increases, resintering times should decrease. For some cemented tungsten carbide compositions, resintering times of 2 to 3 hours at 1510° C. (2750° F.) have been found to be sufficient to provide the needed surface roughness. If the desired surface roughness is not produced after the first resintering treatment, the substrate may be resintered again until the desired surface roughness is produced.

It is believed that the atmosphere during the resintering treatment may also be important to obtaining good coating adhesion to the substrate. It is believed that if a nitrogen atmosphere is utilized during this treatment, the amount of cobalt on the resulting rough surface will be minimized. The nitrogen partial pressure should be controlled to allow cobalt evaporation from the surface. During the resintering one should minimize re-wetting of the surface by additional cobalt from the bulk of the substrate.

The most beneficial nitrogen partial pressure may, therefore, be a function of the substrate composition. Nitrogen partial pressure may also be controlled or varied during the resintering cycle(s) to control the amount and rate of cobalt evaporation from the bulk of the substrate. It is believed that a 0.3 to 50 torr, preferably, 0.3 to 5, and more preferably, 0.3 to 2 torr nitrogen atmosphere should be utilized. It is theorized that the nitrogen atmosphere may allow cobalt on the exterior surfaces of the grains on the substrate surface to evaporate, while sufficient cobalt remains between the surface tungsten carbide grains to keep them well bonded to the remainder of the substrate. Cobalt surface evaporation is accompanied by tungsten carbide grain growth at the surface, resulting in surface roughening.

After the completion of the resintering process, the substrate may then be coated by physical vapor deposition techniques, chemical vapor deposition techniques, or a combination of techniques that includes physical vapor deposition techniques. The tool in this condition may be CVD or PVD coated prior to use. If the as-resintered tool is coated directly, the outermost surface of the coating on flank surfaces will preferably be smoothed by polishing, buffing, laser glazing, or the like in the zone that comes in contact with the workpiece in order that the tool generates the smoothest workpiece surface finish in the cutting operation.

In regard to the surface roughness of the coated cutting tool, the roughness of the rake surface has the same ranges as set out above for the rough rake surface 24. As described above, peripheral grinding, polishing, buffing, or laser glazing the flank surface of the tool will smooth the flank surface while leaving the rough rake surface intact. Typically, the flank face is subjected to buffing so that the roughness of the flank surface is in the same ranges set out above for the smooth flank face 36.

Still another variation on the process of making the basic substrate is to grind, EDM (electric discharge machine), or laser etch a surface roughness into the as-sintered substrate at selected positions on the surface of the rake face. For all of the variations set forth above, if the surface of the flank face of the as-sintered substrate is sufficiently smooth then no further processing is necessary. Typically, if the cutting tool is coated, it is the coating on the flank surface that will be polished, buffed, or laser glazed to achieve the necessary smoothness.

While cutting tools, especially those made from cemented tungsten carbide, are typically fabricated by cold pressing and vacuum (i.e., at a pressure of about $10^{-2}$ to $10^{-3}$ torr) sintering techniques, it should be understood that any of conventional techniques may be used to obtain the basic as-sintered substrate for the present invention.

EXAMPLES

In order to demonstrate the advantages and benefits provided by the present invention, a number of examples, and the results of testing of such examples, are set forth hereinafter.

For all of the examples which are set forth below, unless designated otherwise, the starting substrate was a cobalt cemented tungsten carbide of the following composition and properties: 2.3 to 2.9 weight percent Co; up to 0.4 weight percent Ta; up to 0.1 weight percent Ti; up to 0.1 weight percent Nb and other impurities; and the balance being WC. Other properties of the as-sintered substrate were a Rockwell A hardness between 92.8 and 93.6, a coercive force, $H_c$, between 290 and 440 oersteds, a magnetic saturation sufficient to avoid the formation of eta phase, the average WC grain size was between 1–6 micrometers, the porosity rating was A08, B00, C00 or better, and the density was between 15.10 to 15.50 grams/cc.

For all of the examples, the cutting tool that was used was a SPG-422 (0.0005 inch radius hone) style of tool, which did not have a structural chip breaker.

For those examples that were subjected to resintering, the resintering was performed at 2750° F. for three hours in about 0.5 torr nitrogen atmosphere to produce a surface roughness of above 45 microinches $R_a$. Resintering of the as-sintered and ground substrate typically results in the reduction of the cobalt content in the resintered substrate due to cobalt evaporation at the surface during the resintering process.

For those examples that were subjected to buffing, the buffing was performed for two minutes per edge using a nylon brush whose bristles were impregnating with 120 mesh diamond grit rotating at a speed of 1000 rpm. The brush is available from Jason, Inc. of Cleveland, Ohio.

To evaluate the adherence of various coatings to the substrate of the cutting tool, the following examples; namely, Examples EB46, CN88, CN89, EB56, CO07, CO08, EB66, CQ87, and CQ88, were tested for coating adherence using an indentation adhesion load test. In this regard, adhesion between the coating and the substrate was determined by an indentation adhesion test using a Rockwell hardness tester with a Rockwell A scale Brale cone shaped diamond indenter at a selected load range of 15 kg, 30 kg, 45 kg, 60 kg and 100 kg. The adhesive strength was defined as the minimum load at which the coating debonded and/or flaked. Measurements were performed at two sites on the inserts. The measurements of "100 +" indicate that the coating did not debond or flake at the load of 100 kg, which was the maximum load used in these tests.

A description of these examples is set forth below.

Example EB46 comprised the basic as-sintered cemented tungsten carbide substrate with a TiAlN coating applied via PVD for 4 hours in a CC800 reactor from CemeCon GmbH of Aachen, Germany. This reactor used a magnetron sputtering process to apply the TiAlN. The TiAlN coating had a thickness of about 3.5 micrometers. This example presented one embodiment of the invention wherein a thin single layer coating was applied via PVD to the as-ground substrate.

Example CN88 comprised the basic as-sintered and ground substrate that was subjected to a resintering as described above prior to the application of the TiAlN coating to a thickness of about 3.5 micrometers in the same coating run as for Example EB46. Example CN88 was an embodiment of the invention wherein the substrate was subjected to resintering prior to the application of the thinner TiAlN coating.

Example CN89 was the same as Example CN88.

Example EB56 comprised the basic as-sintered and ground cemented tungsten carbide substrate with a TiAlN coating applied via PVD for 10 hours in the CC800 reactor from CemeCon GmbH of Aachen, Germany. The TiAlN coating had a thickness of about 10.5 micrometers. This example was an embodiment of the invention wherein a thicker single layer coating was applied via PVD to an as-ground substrate.

Example CO07 comprised the basic substrate that was subjected to a resintering (as described above) prior to the application of the TiAlN coating to a thickness of about 10.5 micrometers in the same coating run as for Example EB56. Example CO07 was an embodiment of the invention wherein the substrate was subjected to resintering prior to the application of the thicker TiAlN coating.

Example CO08 was the same as Example CO07.

Example EB66 comprised the basic as-sintered and ground cemented tungsten carbide substrate with a multi-layer coating applied via a combination of CVD and PVD. The coating scheme comprised: the application by CVD of a base layer of TiN that was about 1.0 micrometers thick; the application by CVD of an intermediate layer of TiCN that was about 4.0 micrometers thick, and the application by PVD of a top layer of TiN that was about 4.0 micrometers thick. This example presented one embodiment of the invention wherein a multi-layer coating was applied via CVD and PVD to an as-ground substrate.

Example CQ87 comprised the basic substrate that was subjected to a resintering (as described above) prior to the application of the multi-layer coating in the same coating run as for Example EB66. Example CQ87 was an embodiment of the invention wherein the substrate was subjected to resintering prior to the application of the multi-layer coating.

Example CQ88 was the same as Example CQ87.

The results of the indentation load testing in kilograms is set forth below in Tables I through III. Two measurements were taken for each cutting tool. A higher indentation load test result equates to better coating adherence.

TABLE I

Indentation Load Test Results for Substrate with a 3.5 µm TiAlN PVD Coating

| Example | Condition of the Substrate | Indentation Load (kg) at Failure |
| --- | --- | --- |
| EB46 | as-ground | 45, 60 |
| CN88 | resintered | 100+, 100+ |
| CN89 | resintered | 100+, 100+ |

TABLE II

Indentation Load Test Results for Substrate with a 10.5 µm TiAlN PVD Coating

| Example | Condition of the Substrate | Indentation Load (kg) at Failure |
| --- | --- | --- |
| EB56 | as-ground | 30, 30 |
| CO07 | resintered | 60, 60 |
| CO08 | resintered | 100+, 100+ |

TABLE III

Indentation Load Test Results for Substrate with a CVD-PVD Coating

| Example | Condition of the Substrate | Indentation Load (kg) at Failure |
| --- | --- | --- |
| EB66 | as-ground | 60, 60 |
| CQ87 | resintered | 45, 60 |
| CQ88 | resintered | 45, 45 |

Three samples of a conventional prior art cutting tool (KC730) coated with TiN to a thickness of about 3.5 micrometers by ion plating on a cemented carbide substrate containing about 6 weight percent cobalt were tested for the indentation adhesion load, and the results of two measurements per cutting tool were 30 kg, 45 kg for each one of the three cutting tools.

Referring to Table I, the indentation load results show that for cutting tools having a thinner (about 3.5 micrometer) PVD coating of TiAlN, the adherence of the coating showed significant improvement for those cutting tools having substrates that were resintered after initial sintering and prior to coating. In this regard, Sample Nos. CN88 and CN89 each showed indentation load results of 100+Kg as compared to sample EB46 which had indentation adhesion load measurements of 45 kg and 60 kg. A comparison of the results of Table I against those for the KC730 cutting tool show that the adhesion of the thinner TiAlN coating (samples CN88 and CN89) improves more than two to three times over that of a comparable conventional cutting tool (KC730) when the substantially fully dense substrate is resintered prior to coating.

Referring to Table II, the indentation load results show that the adherence of a thicker (about 10.5 micrometers) coating of TiAlN applied via PVD techniques to an as-ground tool is about the same as that of a conventional cutting tool (KC730) as measured in accordance with the indentation load test. The adherence of the thicker PVD coating is significantly improved over that of the conventional KC730 cutting tool when the substantially fully dense substrate has been resintered before coating.

Referring to Table III, the indentation load results show that for the multi-layer coating [CVD-TiN/CVD-TiCN/

PVD-TiN] there is no significant difference in the indentation adherence load test results between the cutting tools with an as-ground substrate and the cutting tools with a resintered substrate.

Overall, it is apparent that for the cutting tools having the single layer of TiAlN, whether it is about 3.5 micrometers thick or about 10.5 micrometers thick, the resintering of the as-ground substrate significantly improves the coating adhesion strength. The resintering of the as-ground substrate for cutting tools with a CVD-PVD coating does not appear to significantly improve the adherence of the coating to the substrate.

Samples of certain ones of the above cutting tools, as well as two conventional cutting tools, were used to turn 383.2 aluminum (11 weight percent silicon) alloy under the following conditions: speed of 2500 sfm, feed of 0.005 inches per revolution, depth of cut of 0.025 inches, and flood coolant. The results of the these turning test are set forth below in Table IV.

TABLE IV

Chip Formation Test Results

| Example | Condition of the Substrate | Chip Character (FIG. that shows the chips) |
|---|---|---|
| Uncoated Substrate | as-ground, no coating | long continuous stringers, "birds nest" (FIG. 19) |
| KC730 Cutting Tool | as-ground | long continuous stringers, "birds nest" |
| Cutting Tool like EB46 (3.5 µm TiAlN coating) | as-ground | long continuous stringers, "birds nest" (FIG. 20A) |
| Cutting Tool like CN88 (3.5 µm TiAlN coating) | resintered | short coils (FIG. 20B) |
| Cutting Tool like EB66 (CVD-PVD coating scheme) | as-ground | long continuous stringers, "birds nest" (FIG. 21A) |
| Cutting Tool like CQ87 (CVD-PVD coating scheme) | resintered | short coils (FIG. 21B) |

Referring to Table IV, the test results for turning 383.2 aluminum alloy reveal that the use of the substrate that had been resintered provides for much improved chip formation properties. The cutting tools that used resintered substrates, whether in conjunction with a single thin layer (about 3.5 micrometers) of TiAlN or in conjunction with a multi-layer coating scheme, formed chips in the form of short coils. The short coil style of chip is a desirable chip style.

Figures 20A, 20B:
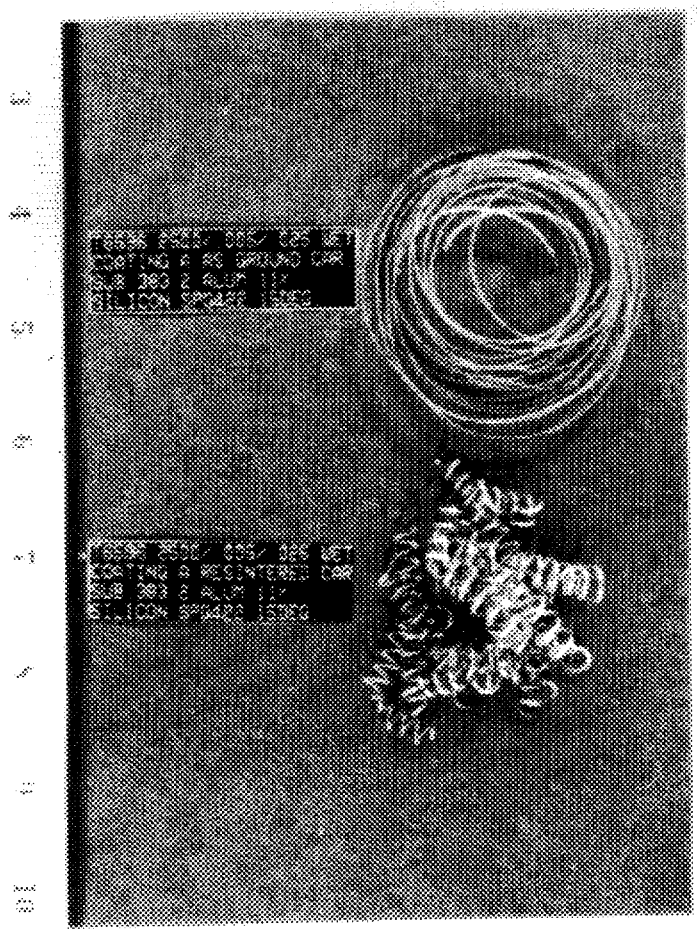
FIG. 20A is a photograph of the "birds nest" type of a chip that was formed from the turning of a 383.2 aluminum alloy workpiece with a WC-Co cutting tool comprising an as-ground substrate coated with a single layer of TiAlN.
FIG. 20B is a photograph of the short desirable type of a chip that was formed from the turning of a 383.2 aluminum alloy workpiece with a WC-Co cutting tool comprising a resintered substrate coated with a single layer of TiAlN.

This is shown in a dramatic fashion for the single thin layer of TiAlN by a comparison of FIG. 20A with FIG. 20B. FIG. 20A is a photograph that shows the undesirable long continuous stringer type of chips. This is in significant contrast to FIG. 20B which shows the tight, short coil type of chip.

Figures 21A, 21B:
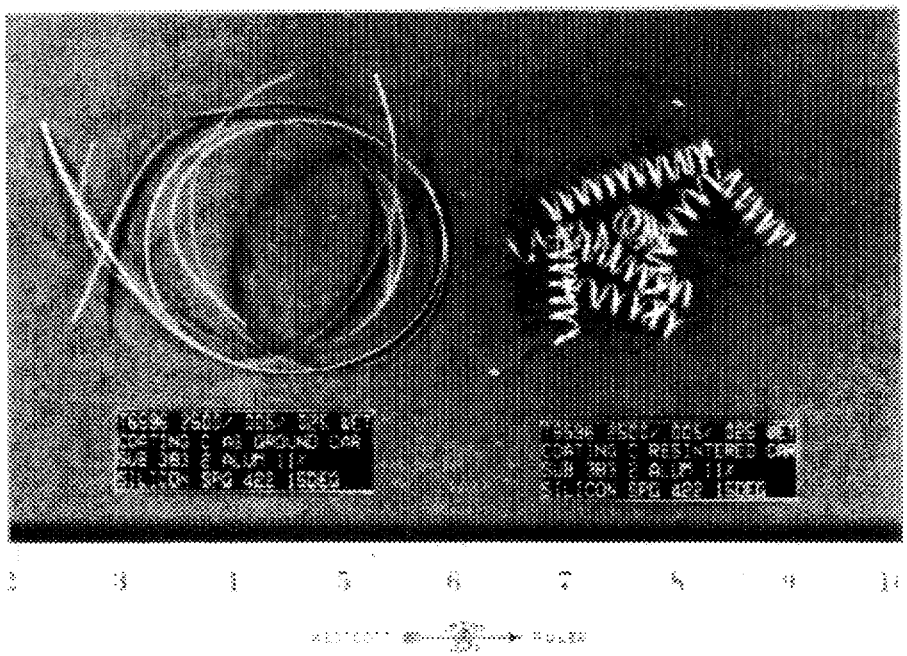
FIG. 21A is a photograph of the birds nest type of a chip that was formed from the turning of a 383.2 aluminum alloy workpiece with a WC-Co cutting tool having an as-ground substrate coated with a multi-layer coating scheme of TiN/TiCN/TiN.
FIG. 21B is a photograph of the short desirable type of a chip that was formed from the turning of a 383.2 aluminum alloy workpiece with a WC-Co cutting tool coated with a multi-layer coating scheme of TiN/TiCN/TiN wherein the substrate was resintered prior to the coating process.

A comparison of FIG. 21A and 21B also shows the significant difference in chip formation between the CVD-PVD coated cutting tools having the as-ground substrate or the resintered substrate. FIG. 21A is a photograph that shows long stringers generated with turning using the coated cutting tool with the as-ground substrate. FIG. 21B is a photograph that shows the tight, short coil style chips generated while turning using the coated cutting tool having the resintered substrate.

Figure 19:
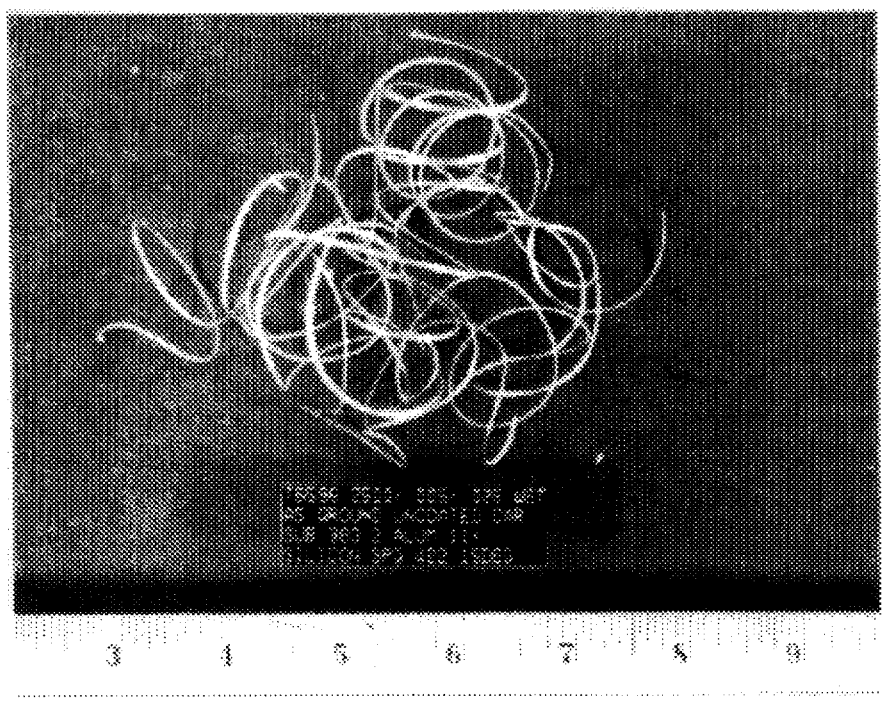
FIG. 19 is a photograph of the "birds nest" type of a chip that was formed from the turning of a 383.2 aluminum alloy workpiece with an uncoated WC-Co cutting tool (uncoated K11)

The formation of short coils for those cutting tools having a resintered substrate was also in contrast to the chip formation of the conventional uncoated K11 substrate cutting tool and the conventional coated KC730 cutting tool. FIG. 19 is a photograph that shows the long continuous stringer chips formed when turning using an uncoated K11 substrate cutting tool. It is very apparent that a cutting tool with a resintered substrate, wherein the rake face has the requisite surface roughness, provides for much improved chip formation properties over a cutting tool with an as-ground substrate in the turning of 383.2 aluminum alloy.

Applicant believes that a cutting tool with the requisite rake surface roughness has particularly good application for chip control when used to machine so-called "gummy" workpiece materials. These workpiece materials include aluminum-based alloys, magnesium-based alloys, copper-based alloys, brass alloys, and mild steel alloys such as, for example, AISI 1008 and AISI 1045 steels.

Figure 18:
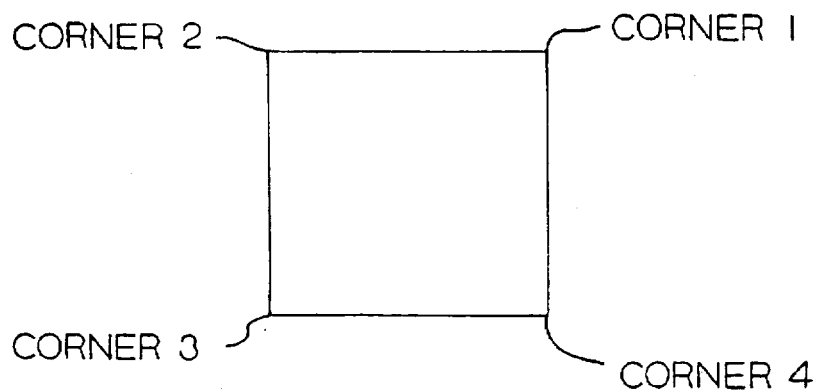
FIG. 18 is a schematic top view of the cutting tool sample CN82 which identifies the four corners of the cutting tool and the locations where surface roughness measurements were taken.

Turning tests on 383.2 aluminum alloy under the conditions set forth above was also performed using Examples EB46 and CN82. The results of these tests are set forth in Table V below. FIG. 18 shows a view of the cutting tool A-CN82 (resintered with 3.5 µm TiAlN) so as to illustrate the four corners of the cutting tool including corners 2 and 4. The flank face of the cutting tool was buffed at corner 4 after coating. The remainder of the cutting tool was not buffed.

TABLE V

Surface Roughness Characteristics of Cutting Tools and the Workpiece Surface Finish

| Tool Material | Surface Condition Prior to Coating | Tool Surface | Buffed After Coating |
|---|---|---|---|
| A-EB46 | As-ground | Rake | No |
| | | Flank | No |
| A-CN82 (Corner 2) | Resintered | Rake | No |
| | | Flank | No |
| A-CN82 (Corner 4) | Resintered | Rake | No |
| | | Flank | Yes |

| Tool Material | Coating Surface Roughness (µinches $R_a$) | Coating Surface Roughness (µinches $R_{tm}$) | Workpiece Surface Finish (µinches $R_a$) | Chip Character |
|---|---|---|---|---|
| A-EB46 | 9 (r) | 142 (r) | 42 ± 7 | Long continuous stringers |
| | 11 (f) | 165 (f) | | |
| A-CN82 (Corner 2) | 55 (r) | 354 (r) | 48 ± 4 | Short Coils |
| | 80 (f) | 387 (f) | | |
| A-CN82 (Corner 4) | 54 (r) | 348 (r) | 31 ± 2 | Short Coils |
| | 8 (f) | 55 (f) | | |

In the coating surface roughnesses reported in Table V above, the use of the "(r)" means the roughness on the rake face of the cutting tool, and the "(f)" means the roughness on the flank face of the cutting tool.

Referring to Table V, the cutting tool that had the resintered substrate with the thin PVD TiAlN coating (CN82) formed short coil style chips in contrast to a cutting tool with an as-ground substrate and the thin PVD TiAlN coating. The roughness of the coating surface is greatest for those surfaces of the resintered substrate wherein the coating was not buffed. For example, the rake and flank surfaces of the as-ground coated cutting tool had surface roughnesses of 9 and 11 microinches $R_a$, (142 and 165 Microinches $R_{tm}$) respectively. This is in comparison to the surface roughness of the coating of a resintered substrate not subjected to buffing which were between 54 and 60 microinches $R_a$ (348 and 387 microinches $R_{tm}$).

Buffing the flank face of the cutting tool with the resintered substrate did much to smooth the surface and therefore decrease the surface roughness. A comparison between opposite corners of sample CN82 shows that buffing decreased the surface roughness of the coating from 60 to 8 microinches $R_a$ (387 to 55 microinches $R_{tm}$).

Buffing the flank face also resulted in a smoother workpiece surface finish. In this regard, the workpiece surface finish from the as-ground cutting tool was 42±7 microinches $R_a$ and the workpiece surface finish from the resintered cutting tool was 48±4 microinches $R_a$. These surfaces finishes are in contrast to 31±2 microinches $R_a$ for the cutting tool (CN82/Corner 4) having the buffed flank surface.

The examples described below; namely, Examples EB46-AL, CN89-RL, CN89-RLB, EB56-AH, CO08-RH, CO08-RHB, EB66-A, CQ87-R and CQ87-RB, were used to turn 304 stainless steel under the following conditions: speed of 800 sfm, feed of 0.008 inches per revolution, depth of cut of 0.060 inches, flood coolant, and a 15° lead angle.

Example EB46-AL comprised the basic as-sintered cemented tungsten carbide substrate with a TiAlN coating applied via PVD for 4 hours to a thickness of about 3.5 micrometers. This example presented one embodiment of the invention wherein the thinner single layer coating was applied via PVD to the as-ground substrate.

Example CN89-RL comprised the basic substrate that was subjected to a resintering prior to the application of the TiAlN coating to a thickness of about 3.5 micrometers in the same coating run as for Example EB46. Example CN89-RL is an embodiment of the invention wherein the substrate is resintered prior to the application by PVD of the thinner single layer coating.

Example CN89-RLB comprised the basic substrate that was subjected to resintering prior to the application of the TiAlN coating to a thickness of about 3.5 micrometers in the same coating run as for Example EB46. Example CN89-RLB was then subjected to buffing of the flank face. Example CN89-RLB was an embodiment of the invention wherein the substrate was resintered, coated with a single PVD layer, and the flank face of the coated cutting tool buffed.

Example EB56-AH comprised the basic as-sintered cemented tungsten carbide substrate with a TiAlN coating applied via PVD for 10 hours to a thickness of about 10.5 micrometers. This example presented one embodiment of the invention wherein a thicker single layer coating was applied via PVD.

Example CO08-RH comprised the basic substrate that was subjected to a resintering prior to the application of the TiAlN coating to a thickness of about 10.5 micrometers in the same coating run as for Example EB56-AH. Example CO08-RH was an embodiment of the invention wherein the substrate is subjected to resintering prior to the PVD application of the thicker TiAlN coating.

Example CO08-RHB comprised the basic substrate that was subjected to a resintering prior to the application of the TiAlN coating to a thickness of about 10.5 micrometers in the same coating run as for Example EB56-AH. The flank face of the coated tool was then subjected to buffing. Example CO08-RHB was an embodiment of the invention wherein the substrate was subjected to resintering prior to the application of the TiAlN coating, and then the flank face of the coated tool was buffed.

Example EB66-A comprised the basic as-sintered cemented tungsten carbide substrate with a multi-layer coating applied via a combination of CVD and PVD. The coating scheme comprised: the application by CVD of a base layer of TiN that was about 1.0 micrometers thick; the application by CVD of an intermediate layer of TiCN that was about 4.0 micrometers thick, and the application by PVD of a top layer of TiN that was about 4.0 micrometers thick. This example presents one embodiment of the invention wherein a multi-layer coating is applied via CVD and PVD to an as-ground substrate.

Example CQ87-R comprised the basic substrate that was subjected to a resintering prior to the application of the multi-layer coating by CVD and PVD in the same coating run as for Example EB66-A. Example CQ87-R is an embodiment of the invention wherein the substrate is subjected to resintering prior to the application of the multi-layer coating.

Example CQ87-RB comprised the basic substrate that was subjected to a resintering prior to the application of the multi-layer coating by CVD and PVD in the same coating run as for Example EB66-A. The flank face of the coated tool was then subjected to buffing. Example CQ87-RB was an embodiment of the invention wherein the substrate was subjected to resintering prior to the application of the multi-layer coating, and then the flank face of the coated tool was buffed.

The results of the turning tests for the 304 stainless steel are set forth below in Tables VI through VIII.

Referring to the left-hand column of the tables, the designations for the "Condition" of the tool have the following meanings. The designation "A" means that the cutting tool had an as-ground substrate prior to the coating process. The designation "R" means that the cutting tool had an as-ground substrate that was resintered prior to the coating process. The designation "R & B" means that the cutting tool had an as-ground substrate that was resintered prior to the coating process and the coated flank face of the cutting tool was buffed.

Referring to the row identified as "Tool Life & Failure Mode", the tool life is measured in minutes. If the cutting tool remained useful, i.e., did not satisfy a pre-selected failure criterion, after 40 minutes of turning, the test was stopped and the tool life recorded as 40.0+ minutes with no failure occurring. If the cutting tool satisfied one of the pre-selected failure modes, then the tool life at the time of failure was recorded in minutes along with the particular mode of failure. The failure modes are described below.

The uniform flank wear ("fw") failure mode occurred when the uniform flank wear reached 0.015 inches. The maximum localized flank wear ("mw") failure mode occurred when the maximum localized flank wear reached 0.030 inches. The maximum crater depth ("cr") failure mode occurred when the maximum crater depth as measured from the surface of the rake face reached 0.004 inches. The maximum depth-of-cut notch ("dn") failure mode occurred when the depth-of-cut notch reached 0.030 inches. The maximum chipping ("ch") failure mode occurred when the size of the chip reached 0.030 inches. The designation "bk" means that the cutting tool broke.

Referring to the row designated as "Condition at 40 minutes", this row reflects the condition of the cutting tool at the end of 40 minutes of turning assuming that the cutting tool was turning at the 40 minute point in the test. This row indicates the condition and the extent of wear for that condition in one-thousandths of an inch.

The corner flaking rating is a numerical rating that rates the extent of corner flaking of the coating. The flank flaking rating is a numerical rating that rates the extent of flank flaking of the coating. For both of these ratings, the rating of "5" means that there was no flaking of the coating. The rating of "3" means that there was noticeable flaking. The rating "1" means that there was severe flaking of the coating. The rating "4" is between ratings "5" and "3", and the rating "2" is between ratings "3" and "1".

The chip flow rating is a numerical rating that rates the extent of chip flow damage to the coating. The rating "5" means that there was no damage due to chip flow. The rating "3" means that there was noticeable damage due to chip flow. The rating "1" means that there was severe chip flow damage. The rating "4" is between ratings "5" and "3". The rating "2" is between ratings "3" and "1".

TABLE VI

Test results for the Turning of 304 Stainless Steel for Cutting Tools of the Substrate with 3.5 µm TiAlN PVD Coating

| Example | EB46-AL | CN89-RL | CN89-RLB |
|---|---|---|---|
| Condition | A | R | R & B |
| Tool Life & Failure Mode | 40.0+ | 10.0 fw | 2.0 ch |
| Condition at 40 minutes | 1.8 (fw) 4.1 (mw) | — | — |
| Corner Flaking Rating | 3 | 5 | 5 |
| Flank Flaking Rating | 4 | 5 | 5 |
| Chip Flow Rating | 5 | 5 | 4 |
| Average Surface Finish (µinches $R_a$) | 114 | 124 | 100 |
| High Surface Finish (µinches $R_a$) | 133 | 124 | 108 |
| Low Surface Finish (µinches $R_a$) | 102 | 124 | 87 |

TABLE VII

Test results for the Turning of 304 Stainless Steel for Cutting Tools of the Substrate with 10.5 µm TiAlN PVD Coating

| Example | EB56-AH | CO08-RH | CO08-RHB |
|---|---|---|---|
| Condition | A | R | R & B |
| Tool Life & Failure Mode | 40.0+ | 14.0 (mw) | 20.0 bk |
| Condition at 40 minutes | 11.2 (fw) 15.4 (mw) | — | — |
| Corner Flaking Rating | 1 | 5 | 5 |
| Flank Flaking Rating | 2 | 5 | 5 |
| Chip Flow Rating | 5 | 3 | 3 |
| Average Surface Finish (µinches $R_a$) | 89 | 148 | 108 |
| High Surface Finish (µinches $R_a$) | 113 | 191 | 114 |
| Low Surface Finish (µinches $R_a$) | 76 | 85 | 100 |

TABLE VIII

Test results for the Turning of 304 Stainless Steel for Cutting Tools of the Substrate with CVD-PVD Coating

| Example | EB66-A | CQ87-R | CQ87-RB |
|---|---|---|---|
| Condition | A | R | R & B |
| Tool Life & Failure Mode | 40.0+ | 40.0 ch | 40.0+ |
| Condition at 40 minutes | 1.7 (fw) 3.2 (mw) | 2.6 (fw) 5.2 (mw) | 4.8 (fw) 11 (mw) |
| Corner Flaking Rating | 4 | 5 | 5 |
| Flank Flaking Rating | 5 | 5 | 5 |
| Chip Flow Rating | 4 | 1 | 2 |
| Average Surface Finish (inches $R_a$) | 85 | 123 | 46 |
| High Surface Finish (inches $R_a$) | 94 | 137 | 53 |
| Low Surface Finish (inches $R_a$) | 82 | 88 | 35 |

The conventional KC730 cutting tool had a tool life of 2.0 minutes and the failure mode was chipping. The corner flaking rating was 2, the flank flaking rating was 5, and the chip flow damage rating was 4. The conventional uncoated K11 cutting tool had a tool life of 0.4 minutes and the failure mode was breakage. The chip flow damage rating was 4.

Referring to Table VI, the cutting tools having the as-ground substrate with a single thin (3.5 micrometers) PVD layer of TiAlN experienced much greater tool life in the turning of 304 stainless steel than the conventional cutting tool and the cutting tools having the resintered substrate. The as-ground cutting tool (EB46-AL) had a tool life of 40+ minutes as compared to 10 minutes and 2 minutes. The cutting tools that had the resintered substrate had the best ratings for corner flaking, flank flaking, and chip flow damage as compared to the cutting tools with the as-ground substrate. The average workpiece surface finish was higher, i.e., rougher, for the cutting tool with a resintered substrate. Buffing the flank of the cutting tool with the resintered substrate helped reduce the roughness of the workpiece surface finish.

Referring to Table VII, the cutting tools having the as-ground substrate with the single thick (10.5 micrometer) PVD layer of TiAlN experienced much greater tool life in the turning of 304 stainless steel than the conventional cutting tool. The cutting tools with the resintered substrate and the single thick PVD layer of TiAlN experienced greater tool life than the conventional cutting tool, but less tool life than the as-ground cutting tools. The resintered cutting tools had a better corner flaking rating and flank flaking rating than the as-ground cutting tools. The as-ground cutting tools had the best chip flow damage rating. The as-ground cutting tool resulted in workpiece surface finishes that were the smoothest. The resintered cutting tools had the roughest workpiece surface finishes. Buffing reduced the workpiece surface roughness (CO08-RHB).

Referring to Table VIII, the cutting tools with the multilayer coating experienced improved tool life over that of the conventional cutting tool. The resintered cutting tools had excellent corner flaking and flank flaking ratings. The as-ground cutting tool had the best chip flow damage rating while the other cutting tools had lower ratings. The resintered cutting tools subjected to buffing produced workpieces with the smoothest surface finishes. The resintered cutting tools produced workpieces with the roughest surface finishes.

Referring again to Table VI through VIII, these cutting tools having a low cobalt (2.9 weight percent) substrate experienced outstanding tool life in the turning of 304 stainless steel. More specifically Example EB46-AL (as-ground low cobalt substrate/3.5 μm TiAlN PVD coating) had a tool life of 40.0+ minutes with no failure. Example EB56-AH (as-ground low cobalt substrate/10.5 μm TiAlN PVD coating) had a tool life of 40.0+ minutes with no tool failure. Example EB66-A (as-ground low cobalt substrate/CVD-PVD coating) had a tool life of 40.0+ minutes with no failure. Example CQ87-R (resintered low cobalt substrate/CVD-PVD coating) had a tool life of 40.0 minutes with failure by chipping. Example CQ87-RB (resintered and buffed low cobalt substrate/CVD-PVD coating) had a tool life of 40.0+ minutes with no failure. Very clearly, the use of a low cobalt-WC substrate with any one of the coating schemes results in a tool life that surpasses the comparable conventional cutting tools (KC730 and uncoated K11).

The coating schemes as set forth in the specification herein have application for use with substrates that present a binder-enriched peripheral layer. When used with the binder-enriched substrates, these coating schemes should have the same advantages and beneficial results that exist with respect to the low cobalt substrates as set forth in this specification.

Other specific embodiments of the invention will be apparent to those skilled in the art from a consideration of this specification or practice of the invention disclosed herein. It is intended that the specification and specific embodiments be considered as exemplary only, with the true scope and spirit of the invention being indicated by the following claims.

What is claimed is:

1. A coated cutting tool comprising:
   a substrate; and
   a PVD coating applied directly onto the surface of the substrate, the PVD coating having an adherence as measured by the Rockwell A indentation adhesion load test of greater than or equal to 80 kg.

2. The coated cutting tool of claim 1 wherein the adherence of the PVD coating as measured by the Rockwell A indentation adhesion load test is greater than or equal to 100 kg.

3. The coated cutting tool of claim 1 wherein the PVD coating has a thickness of at least about 3 micrometers on the flank face.

4. The coated cutting tool of claim 1 wherein the PVD coating had a thickness of at least about 3 micrometers on the rake face.

5. The coated cutting tool of claim 1 wherein the coating includes TiAlN.

6. The coated cutting tool of claim 1 wherein the coating includes alumina.

7. The coated cutting tool of claim 1 wherein the coating includes TiC.

8. The coated cutting tool of claim 1 wherein the substrate comprises a hard carbide and binder, the substrate having a binder enriched peripheral layer.

9. The coated cutting tool of claim 1 wherein the substrate has a substantially uniform microstructure.

10. The coated cutting tool of claim 1 wherein the coating includes cubic Boron Nitride.

11. The coated cutting tool of claim 1 wherein the substrate has a rake face and a flank face, an edge being at the joinder of the rake face and the flank face, the substrate having a composition of between 0.2 and 2.9 weight percent Co, and the balance consisting essentially of WC.

12. The coated cutting tool of claim 11 wherein the substrate contains between about 2.3 and about 2.9 weight percent cobalt.

13. A coated cutting tool comprising:
    a substrate;
    a PVD coating directly on the surface of the substrate, the PVD coating having a thickness of at least 6 micrometers on a selected one of the rake face or the flank face, and the PVD coating having an adherence as measured by the Rockwell A indentation adhesion load test is greater than or equal to 60 kg.

14. The coated cutting tool of claim 13 wherein the substrate comprises a hard carbide and a binder metal, and the substrate having a binder enriched layer near the periphery thereof.

15. The coated cutting tool of claim 13 wherein the substrate has a substantially uniform microstructure.

16. The coated cutting tool of claim 13 wherein the PVD coating has a thickness of between 6 and 15 micrometers, and the adherence of the coating as measured by the Rockwell A indentation adhesion load test is equal to or greater than 60 kg.

17. The coated cutting tool of claim 16 wherein the PVD coating has a thickness of between 6 and 12 micrometers.

18. A coated cutting tool comprising:
    a substrate having a rake face and a flank face, an edge being at the joinder of the rake face and the flank face, the substrate having a composition of between 0.2 and 2.9 weight percent Co, and the balance consisting essentially of WC; and
    a coating where the outer layer being applied by PVD.

19. The coated cutting tool of claim 18 wherein the coating is a multi-layer coating.

20. The coated cutting tool of claim 19 wherein the coating further includes a base layer of CVD-applied TiN and an intermediate layer of CVD-applied TiCN.

21. The coated cutting tool of claim 19 wherein the coating has an adherence as measured by the Rockwell A indentation adhesion load test of greater than or equal to 45 kg.

22. The coated cutting tool of claim 19 wherein the rake face of the coated cutting tool has a surface roughness of at least about 45 microinches $R_a$.

23. The coated cutting tool of claim 18 wherein the coating is a single layer.

24. A cutting tool made by powder metallurgical techniques including pressing a powder composition into a green compact, the tool comprising:
    a substrate with a rake face and a flank face wherein a cutting edge is at the joinder of the rake face and the flank face; and
    the rake face presents a roughened surface formed during the pressing of the green substrate.

25. The cutting tool of claim 24 further including a wear-resistant coating on the rake face and the flank face.

26. The cutting tool of claim 25 wherein the coating is applied by PVD.

27. The cutting tool of claim 25 wherein the coating is applied by CVD.

28. The cutting tool of claim 25 wherein the coating has a first layer applied by CVD and a second layer applied by PVD.

29. The cutting tool of claim 25 wherein the coating is diamond.

30. The cutting tool of claim 24 wherein the rake face includes a structural chip breaker.

31. The cutting tool of claim 24 wherein the flank face presents a surface that is smoother than the rake face.

32. The cutting tool of claim 24 wherein the roughness of the rake surface is between 15 microinches $R_a$ and 125 microinches $R_a$.

33. The cutting tool of claim 24 wherein the flank face has a surface roughness less than 15 microinches $R_a$.

34. A cutting tool comprising:
a rake face and a flank face wherein a peripheral edge is at the joinder of the rake face and the flank face; and
the rake face presents a roughened surface formed by mechanical action upon the rake face.

35. The cutting tool of claim 34 further including a wear-resistant coating on the rake face and the flank face.

36. The cutting tool of claim 34 wherein the rake face includes a structural chip breaker.

37. The cutting tool of claim 34 wherein the flank face presents a surface that is smoother than the rake face.

38. A coated cutting tool comprising:
a substantially fully dense substrate having a rake surface and a flank surface, the rake surface of the substrate having a surface roughness of between 15 microinches $R_a$ and 125 microinches $R_a$; and
an outer coating applied by physical vapor deposition so that the cutting tool presents a coated rake face and a coated flank face.

39. The coated cutting tool of claim 38 wherein the flank surface of the substrate having a surface roughness of between 15 microinches $R_a$ and 125 microinches $R_a$.

40. The coated cutting tool of claim 38 wherein the coated rake face has a surface roughness of between 15 microinches $R_a$ and 125 microinches $R_a$, and the coated flank face has a surface roughness of between 15 microinches $R_a$ and 125 microinches $R_a$.

41. The coated cutting tool of claim 38 wherein the coated rake face has a surface roughness of between 15 microinches $R_a$ and 125 microinches $R_a$, and the coated flank face has a surface roughness that is less than the surface roughness of the coated rake face and is less than 25 microinches $R_a$.

42. The coated cutting tool of claim 38 wherein the coated rake face has a surface roughness less than 25 microinches $R_a$, and the coated flank face has a surface roughness less than 25 microinches $R_a$.

43. The coated cutting tool of claim 38 wherein the flank surface of the substrate has a surface roughness that is less than the surface roughness of the rake surface and which is less than 25 microinches $R_a$.

44. The coated cutting tool of claim 43 wherein the coated rake face has a surface roughness of between 15 microinches $R_a$ and 125 microinches $R_a$, and the coated flank face has a surface roughness that is less than the surface roughness of the coated rake face and is less than 25 microinches $R_a$.

45. The coated cutting tool of claim 43 wherein the coated rake face has a surface roughness of less than 25 microinches $R_a$, and the coated flank face has a surface roughness of less than 25 microinches $R_a$.

46. The coated cutting tool of claim 38 wherein the composition of the substrate comprises: between 0.2 and 2.9 weight percent Co; and the balance consisting essentially of tungsten carbide.

47. The coated cutting tool of claim 38 wherein the roughened rake surface is achieved by resintering the as-sintered substrate.

48. The coated cutting tool of claim 47 wherein the resintering occurs in a nitrogen atmosphere.

49. The coated cutting tool of claim 38 wherein the substrate is a ceramic.

50. The coated cutting tool of claim 38 wherein the substrate is a reinforced ceramic.

51. The coated cutting tool of claim 38 wherein the substrate is a cermet.

52. The coated cutting tool of claim 38 wherein the substrate is polycrystalline diamond.

53. The coated cutting tool of claim 38 wherein the substrate is polycrystalline cubic Boron Nitride.

54. The coated cutting tool of claim 38 wherein the substrate comprises a hard carbide and a binder metal, and the substrate having a binder-enriched peripheral layer.

55. The coated cutting tool of claim 54 wherein the PVD coating has an adherence as measured by the Rockwell A indentation adhesion load test of greater than or equal to 60 kg.

56. The coated cutting tool of claim 55 further including at least one layer between the PVD layer and the substrate applied by chemical vapor deposition.

57. An uncoated cutting tool comprising:
a polycrystalline diamond substrate having a rake face, a flank face and a cutting edge formed at a juncture of the rake face and flank face; and
wherein said rake face has a roughened surface.

58. The uncoated cutting tool according to claim 57 wherein said roughened surface is formed by laser etching.

59. The uncoated cutting tool according to claim 57 whereby said roughened surface provides acceptable chip control when said cutting tool is used in a chip forming machining operation.

60. The uncoated cutting tool according to claim 57 wherein said roughened surface has a surface roughness of between 15 microinches Ra and 125 microinches Ra.

61. The uncoated cutting tool according to claim 57 wherein said roughened surface has a surface roughness of between 25 microinches Ra and 125 microinches Ra.

62. The uncoated cutting tool according to claim 57 wherein said roughened surface has a surface roughness of between 40 microinches Ra and 80 microinches Ra.

* * * * *